United States Patent [19]

Keiun

[11] 4,418,654
[45] Dec. 6, 1983

[54] FUEL SUPPLEMENT SUPPLYING DEVICE FOR AN INTERNAL COMBUSTION ENGINE

[76] Inventor: Kodo Keiun, 1-9, 4-chome, Sakuragaoka, Minoo, Osaka, 562, Japan

[21] Appl. No.: 382,640

[22] Filed: May 27, 1982

[30] Foreign Application Priority Data

May 27, 1981 [JP] Japan ................................ 56-80294

[51] Int. Cl.$^3$ ............................................. F02M 25/02
[52] U.S. Cl. .............................. 123/25 A; 123/25 E; 123/25 L; 123/198 A; 261/18 A
[58] Field of Search ................ 123/25 R, 25 A, 25 E, 123/25 L, 198 A; 261/18 A

[56] References Cited

U.S. PATENT DOCUMENTS

| | | | |
|---|---|---|---|
| 2,843,216 | 7/1958 | Powell | 123/25 A |
| 3,845,745 | 4/1974 | Dunlap et al. | 123/25 C |
| 3,991,724 | 11/1976 | Geiser | 123/25 R |
| 4,068,625 | 1/1978 | Brown | 123/25 A |
| 4,170,960 | 3/1979 | Germack et al. | 123/198 A |
| 4,191,134 | 7/1980 | Goodman | 123/25 J |
| 4,208,989 | 6/1980 | Hart | 123/25 B |
| 4,240,380 | 3/1980 | Slagle | 123/25 C |
| 4,289,508 | 9/1981 | Robert | 123/25 A |
| 4,306,519 | 12/1981 | Schoenhard | 123/25 A |
| 4,306,520 | 12/1981 | Slaton | 123/25 A |

*Primary Examiner*—Ira S. Lazarus
*Attorney, Agent, or Firm*—Armstrong, Nikaido, Marmelstein & Kubovcik

[57] ABSTRACT

A fuel supplement supplying device for an internal combustion engine to add a liquid additive such as water, methanol, or the like into the air being introduced prior to be mixed with a fuel is disclosed. The device includes a hollow vaporizing head of porous material disposed within the induction duct leading to the combustion chamber of the internal combustion engine to define a constricted annular zone between the head and the induction duct. The liquid additive as above is fed from a reservoir via a feed line to the vaporizing head where the same is subjected to the negative pressure in response to a vacuum developed in the induction duct upon operation of the engine to whereby be sucked or seeped out through the porous wall of the vaporizing head into the stream of the air passing through said constricted annular zone. The liquid additive thus seeped out is vaporized on the surface of the head in the passing air to moisten the introducing air prior to being mixed with fuel. Thus, the liquid additive is to be added in the air-fuel mixture in proper amounts responsive to the vacuum within the induction duct, i.e., to the engine speed so as to increase the combustion efficiency over the operation range of the engine.

7 Claims, 11 Drawing Figures

FUEL SUPPLEMENT SUPPLYING DEVICE FOR AN INTERNAL COMBUSTION ENGINE

BACKGROUND OF THE INVENTION

1. Fields of the Invention

This invention relates to a fuel supplement supplying device for an internal combustion engine, more particularly to a device for adding a liquid additive to the air being introduced prior to be mixed with fuel in order to increase the combustion efficiency and reduce harmful emissions of an internal combustion engine.

2. Description of the Prior Art

It is well known for internal combustion engines that the addition of proper amounts of liquid additives such as water, hydrocarbon liquids containing oxgen, for example methanol, ethanol and the water solution thereof to the air-fuel mixture will enhnace combustion efficiency as well as reduce harmful emissions of carbon monoxide CO, unburned hydrocarbons HC, and oxides of nitrogen NOx contained in the engine exhaust gas. various types of conventional devices have been proposed to add such liquid additive to the air-fuel mixture, either by mixing it directly with the fuel or by mixing it with the introducing air prior to mixing with the fuel. With the devices of former type, homogeneous mixture of the additive and the fuel is difficult to be attained so as to bring about unstable engine operations under certain conditions such as under starting conditions and under accelerating conditions. Further these devices have their own drawback that they cannot control the ratio of the additive to the fuel in accordance with load variations, that is, they cannot provide an optimum ratio of the additive and air-fuel mixture over the wide operational range of the engine. While the prior device of the latter type normally has a pump means and a control means which act to provide proper amount of the additives into the air-fuel mixture in accordance with engine operating conditions. However, these means render the device rather complex, which will require frequent maintenance, and expensive to manufacture.

It is still advantageous for controlling the amount of the additive in response to engine speeds to provide an additive supplying means independent of a fuel feed line.

SUMMARY OF THE INVENTION

The present invention has been devised to be used in conjunction with an internal combustion engine to supply a liquid additive in the air flowing into the combustion chamber, and is designed with a vaporizing head of porous material to vaporise the liquid additive on the surface thereof into the introducing air prior to being mixed with a fuel. The fuel supplement supplying device according to the present invention is characterized in that the vaporized head of porous material is disposed within the induction duct leading to the combustion chamber of the engine upstream of the mixing region of the fuel with the introducing air so as to define a constricted annular zone between the head and the duct. The liquid additive such as water, methanol, ethanol, propanol, aceton, the water solution thereof and the like for moistening the air drawn into the combustion chamber to lower the combustion temperature is stored in a reservoir disposed outside of the induction duct. By a vacuum developed within the duct upon operation of the engine, this additive is fed from the reservoir to the head from which it is sucked or seeped out by the vacuum force proportionally developed responsive to the engine RAM to steep the surface of the head which is in contact with the introducing air. Then the liquid additive in the surface of the head is vaporized into the air passing through the duct to moisten it prior to reaching the mixing area of the fuel and the air. The amount of the additives added to the air is proportional to a vacuum developed in response to engine revolutions, i.e., the addition of the additive is automatically effected in accordance with the engine load variations, accordingly controlled amounts of the additive are supplied into the air without any additional pump and control means so as to increase combustion efficiency over the operational range of the engine. Also, this varporization is effected on the substantially entire periphery of the head which is in contact with the air passing through said constricted annular zone such that the additives can be uniformly incorporated or moisten thoroughly the air to assure the expected effects.

It is, therefore, a primary object of the present invention to provide a fuel supplement supplying device for an internal combustion engine that is capable of automatically controlling the amount of the additive to be added to the introducing air in response to engine conditions in such a way as to the additive is supplied to the air in requisite amounts throughout the operational range of the engine.

Another object of the present invention is to provide a fuel supplement supplying device of simple construction which assure greater overall reliability and longevity as well as require a minimum in maintenance.

Still another object of the present invention is to provide a fuel supplement supplying device that is capable of producing the air having the additive thoroughly vaporized therein to bring about maximum effect of the additive.

The present invention also discloses the advantageous configuration of a conical-shaped vaporizing head of porous material which serves to improve vaporization efficiency along with air flow efficiency in such a way that the additive can be easily vaporized on the entire surface thereof in variable amounts over a wider range from at the constant running condition under light load to at the rapid accelerating condition under heavy load.

The present invention discloses further configuration in which a slidable venturi ring is adapted to adjust the velocity of the air passing through the annular zone such that the amount of the additive to be varporized on the surface of the head can be adjusted in proportion to the capacity and type of the engine. Accordingly, further object of the present invention is to provide a fuel supplement supplying device that is capable of being easily adapted to the engines of different capacities and types.

Still further advantages and characteristics of the invention are depicted in the claims and the following detailed description, explaining preferred embodiments by way of example only.

DETAILED DESCRIPTION OF THE PREFERRED EMBODIMENTS

Figure 1:
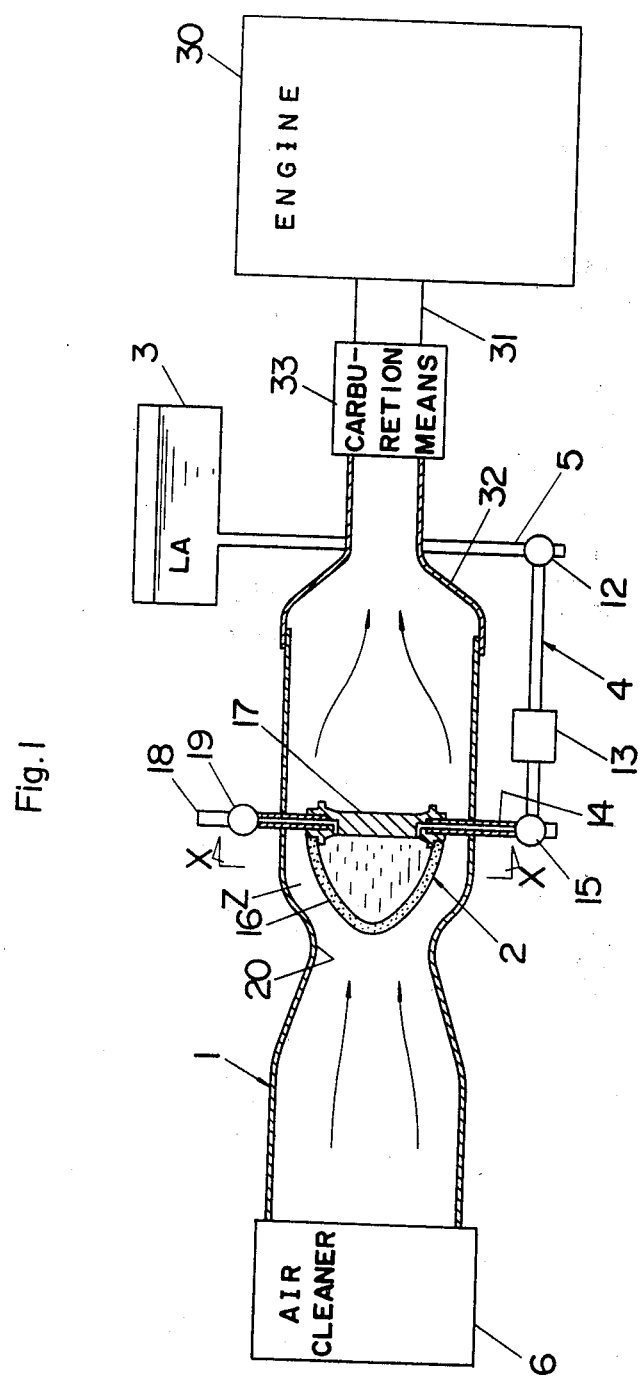
FIG. 1 is a schematic view of a first preferred embodiment of the present invention.
Figure 2:
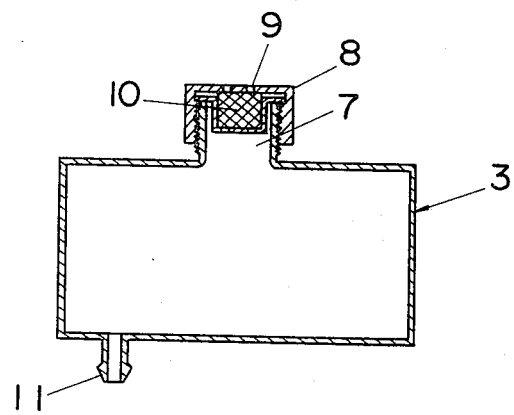
FIG. 2 is a detail sectional view of the reservoir employed in the preferred embodiments of the present invention.
Figure 3:
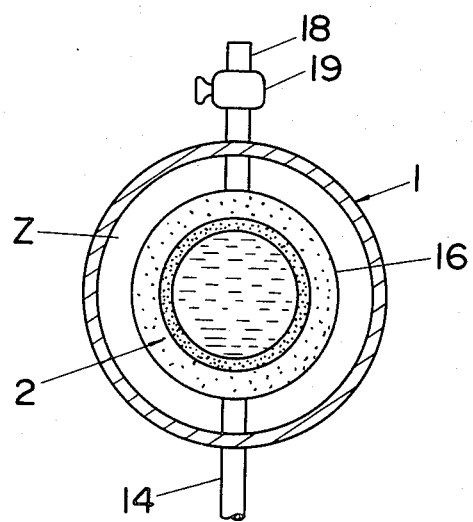
FIG. 3 is a sectional view taken along the line X—X of FIG. 1.

Referring now to FIG. 1, there is shown a fuel supplement supplying device of the present invention composed basically of an induction duct 1 of circular cross-section, a vaporizing head 2 of porous material, a reservoir 3 receiving a volume of a liquid additive, and a feed line 4 interconnecting the vaporizing head 2 and the reservoir 3. The device is adapted to be used in conjunction with an internal combustion engine 30 having a carburation means 33 in an intake manifold 31. The induction duct 1 is positioned in series with the intake manifold 31 of conventional design and is communicatively connected at one end thereof to the flared opening 32 of the intake manifold 31 and opened at the opposite end to a source of air at an ambient pressure level. At the opened end of the duct 1 there is provided with an air cleaner 6 of conventional type which would be otherwise received at the flared opening 32 of the intake manifold 31. The reservoir 3 is installed at any convenient area above the line of the induction duct 1 and the intake manifold 31 to store a volume of the liquid additive, for example, water, methanol ethanol, propyl alcohol, butanol, acetone, and the water solution thereof. Such liquid additives are to be mixed as a fuel supplement to the air-fuel mixture in such a way as to lower the combustion temperature and therefore increase combustion efficiency. As shown in FIG. 2, the reservoir 3 has at its upper end an inlet 7 through which the additive is replenished at times. To the inlet 7 is threadedly fitted a cap 8 with an air vent 9 through which the ambient air is drawn, by the vacuum developed within the duct 1, into the reservoir 3 to expel the additive toward the vaporizing head 2. Within the inlet 7 is held an air filter means 10 filtering the incoming air through the air vent 9. The reservoir 3 is communicatively connected to the head 2 via the feed line 4 composed of a tube 5 having a first drain valve 12 and a filter means 13 therein for preventing the head 2 from becoming clogged and a pipe 14 having a second drain valve 15 at the intersection with the tube 5, the first drain valve 12 being used for draining the reservoir 3 of the additive and the second drain valve 15 for draining the head 2 of the additive. Said tube 5 is preferrably made of flexible material and is connected at its upper end to an outlet 11 of the reservoir 3. The vaporizing head 2 as above is composed of a conical hollow member 16 of porous material and a base plate 17 of solid material closing the bottom opening of the head 2 to receive said liquid additive therein, and is disposed coaxially within the duct 1 with its top facing upstream as to prevent possible turbulence in the air reaching the head 2. This head 2 is held within the induction duct 1 by said pipe 14 and an air vent pipe 18, each of these pipes 14 and 18 penetrating radially the wall of the duct 1 and being communicativley connected at its one end to each of the circumferentially spaced apart portions on the outermost periphery of the head 2. The juncture of the head 2 and the duct 1 as well as that of the head 2 and pipes 14, 18 should be leakproof to allow full vaporization of the additive over the porous wall of the head 2. Said air vent pipe 18 is opened at its outer end to the atmosphere and is provided with an air release valve 19, which is normally closed and opened only when the additive is initially fed from the reservoir 3 to the head 2 as well as when the same is drained off. The vaporizing head 2 thus held coaxially with the induction duct 1 defines between the head 2 and the duct 1 an axially elongated and radially constricted annular zone Z through which the incoming air is channeled to the intake manifold 31 where the same is mixed with the feul by the carburetion means 33 to become inflamable gas to be fed in the combustion chamber of the engine 30. Included in the porous material constructing said conical hollow member 16 of the head 2 are unglazed ceramic and porous glass (foam glass) having per se many minute pores of approximately 0.1 micron diameter therethrough and foam plastics with open (intercommunicating) cells of the same diamter through both of which said additive is capable of permeating. Such material is also characterized in that a large number of the minute pores or cells are diffused substantially uniformly throughout the entire area thereof. Thus, the minute pores or cells are to be arranged in the surface of the head 2 in longitudinally spaced and circumferentially spaced apart relationship. Upstream of the head 2 is located a venturi portion 20 which is formed by narrowing the duct 1 at the section in proximity to the top of the head 2 to a reduced diameter such that the velocity of the air drawn through the air cleaner 6 is increased to reach and then pass through said constricted annular zone Z.

Operation of the present invention will be hereinafter discussed with reference to the embodiment disclosed as above. Prior to operation, the device is installed on the existing engine 30 with the one end of the induction duct 1 receiving the air cleaner 6 removed from the opening 32 of the existing intake manifold 31 and the other end of the duct 1 connected to the same opening 32 of the intake manifold 31. When the engine 30 is started, the negative pressure, which develops in the induction duct 1 during the induction stroke of the engine 30, causes the fresh air to be drawn through the induction duct 1 and the intake manifold 31 into the combustion chamber. The air thus drawn in the induction duct 1 will increase its velocity at the venturi portion 20 so as to pass through the annular zone Z at a higer velocity and therefore cause the static pressure on the side wall of the head 2 to diminish to a negative value in relation to the surroundings. It follows that the liquid additive LA fed to the head 2 will be subjected to this negative pressure as to be sucked or seeped out through the porous wall of the head 2. Consequently, the entire surface of porous wall will be filled and made wet with the additive thus seeped out. The additive in the surface of wall of the head 2 is immediately exposed to the annular stream of the air passing through said zone Z so as to be vaporized thoroughly in the same on the entire surface thereof and therefore moisten uniformly the air flowing toward the combustion chamber.

The resulting moisture-laden air is then mixed with the fuel at the carburetion means 33 on the way to the chamber in the case of the present device being installed on the engine with carburetion means 33, or mixed with the fuel at the chamber in the case of the device being installed on the engine of fuel injection type. The liquid additive is added to the passing air in varying amounts in response to a vacuum or ngative induction duct pressure, that is, larger amounts of the additive is supplied to the air at higher engine speeds and smaller amounts of the additives supplied at lower engine speeds, which means that the amount of the additive is automatically controlled by the engine speeds to provide requisite amounts of the same in accordance with load variations.

For example, in the normal automobile engine provided with a carburetor and using gasoline as fuel, the carburetor is adjusted to provide a lean air-fuel mixture (the air-fuel ratio of between 16:1 and 18:1) under light loads and provide a rich mixture (the same of between 13:1 and 14:1) under heavy loads, the device of the present invention when installed on such engine will add the controlled amounts of the additive to the introduced air prior to being mixed with the fuel, so that the additive is fed to the fuel in an amount directly proportional to the amount of the air with which the fuel is to be mixed. That is, less additive in relation to the fuel will be attained under heavy loads in such a way as not to substantially rise the requisite air-fuel ratio set by the carburetion means, while the total amounts of the additive is increasingly fed to the combustion chamber for lowering the combustion temperature. With the result of that, higher output will be obtained under such heavy load conditions as at starting and rapid accelerating conditions. On the other hands, under light loads such as at cruising conditions, more additive in relation to the fuel is to be fed to somewhat rise air-fuel ratio, however, the entire amount of the additive is maintained at lower levels so as to cause no substantial drops in the output, rather cause the increase in the output due to the effect of the additive to lower the combustion temperature at such light load conditions. Accordingly, the additive is to be supplied to the air-fuel mixture in requisite amounts in response to the engine conditions such that nearly perfect combustion will take place accompanied by the decrease in combustion temperature over the full range of load conditions. This leads to the increase in the engine efficiency as well as the decrease in the harmful emissions of carbon monoxide CO, unburned hydrocarbons HC, and oxides of nitrogen NOx contained in the engine exhaust gas, lessening air pollution.

Figure 4:
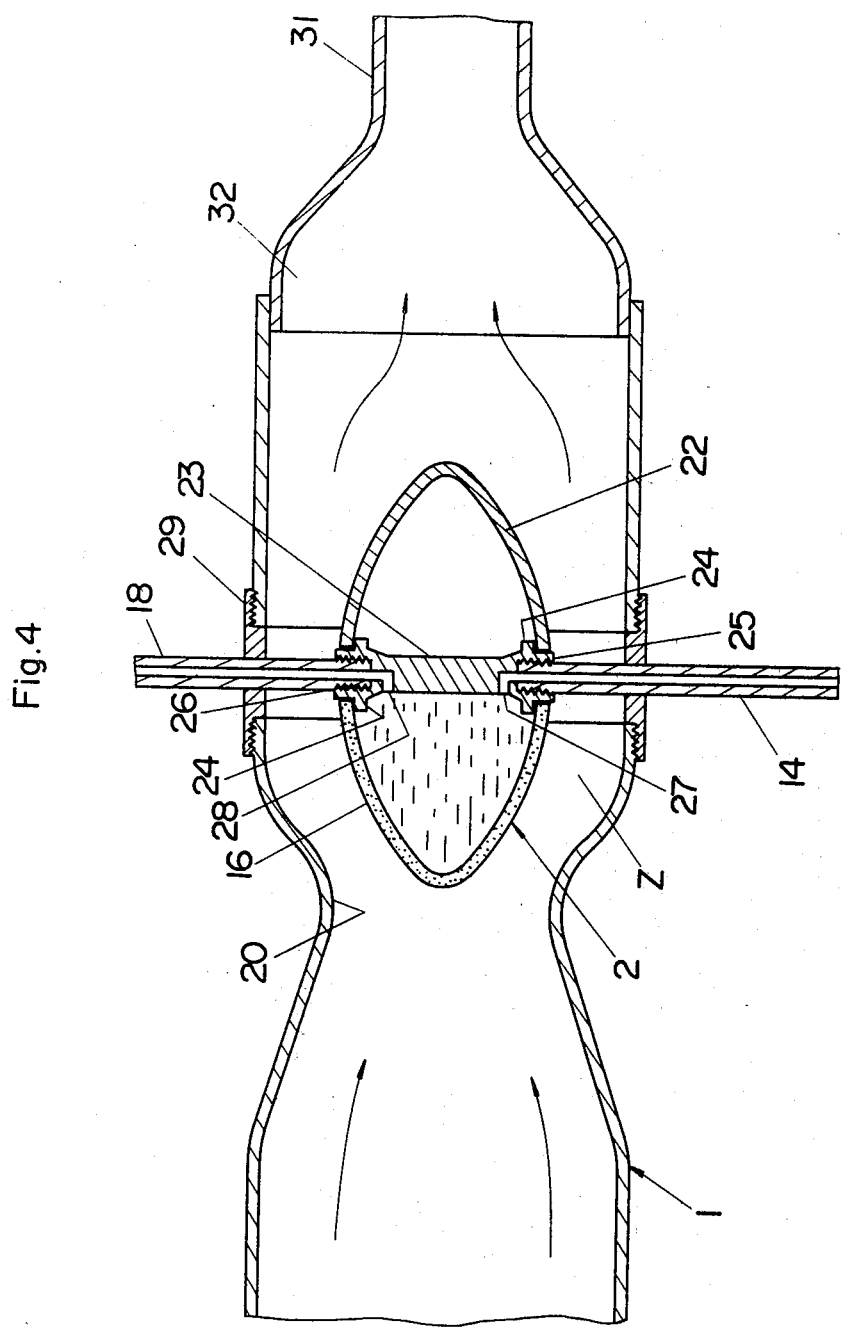
FIG. 4 is a sectional view of a part of a second preferred embodiment of the present invention.

Referring to FIG. 4, there is shown the second preferred enbodiment of the present invention made in an attempt to prevent the formation of a turbulent flow in the air leaving the head 2 or said annular zone Z. This figure also shows particular details of the construction of the vaporizing head 2. In this embodiment, the conical hollow member 16 of porous material is combined with the conical hollow member 22 of solid material to form an ellipsoidal vaporizing head 2, which is disposed coaxially within the induction duct 1 with the porous member 16 facing upstream. These two hollow members 16 and 22 are of same dimensions and joined by the base plate 23 interposed therebetween. The base plate 23 is of circular shape having the diamater equal to those of the openings of the above members and has on both sides annular projections 24 to define respectively peripheral recess. Within each of the recesses is fixed corresponding fringe of the members 16 and 22 by an adhesive agent such as urethane resin and epoxy resin. The plate 23 is also provided in its outer surface with circumferentially spaced apart openings 25 and 26 which threadedly receive the ends of the pipes 14 and 18 respectively. Inwardly or centrally of the annular projections are formed apertures 27 and 28 opened to the interior of the porous hollow member 16, one aperture 27 communicating with the opening 25 to form a passage of the additive fed from the reservoir 3 via the pipe 14 into the interior of the porous member 16 and the other aperture 28 communicating with the opening 26 to form with the air vent pipe 18 an air release passage leading from the interior of the member 16 to the atmosphere. These pipes 14 and 18 penetrate the ring 29, which interconnects two pipe members constructing the induction duct 1, and fixedly engage with the ring 29 to support the head 2 within the induction duct 1. With this arrangement that the vaporising head 2 of ellipsoidal configuration is coaxially disposed within the induction duct 1, the air leaving the head 2 after receiving the vapor of the additive is channeled toward the intake manifold 31 without being turbulated such that the air carrying the additive is drawn smoothly into carburetion means 33 or the combustion chamber, assuring to maintain throughout the engine conditions the proper air-fuel ratio prescribed on the engine side.

Figure 7:
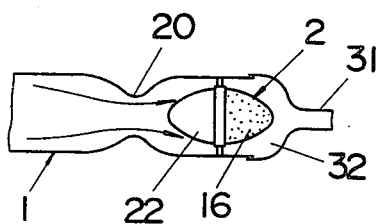
FIGS. 7 and 8 are schematic views showing respectively third and fourth preferred embodiments of the present invention.
Figure 8:
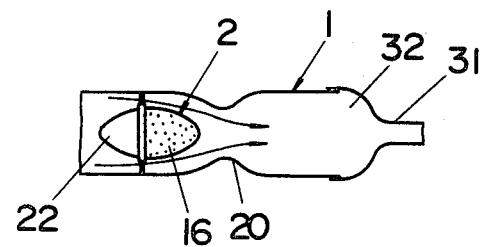

Referring also to FIGS. 7 to 8, there are shown other preferred embodiments of the present invention in which the vaporizing head 2 of the same construction as disclosed in FIG. 4 is disposed within the induction duct 1 with the porous conical member 16 facing downstream and the solid conical member 22 facing upstream. In these embodiments, the conical hollow member of solid material serves to prevent the formation of the vortex or turbulence in the air reaching the head 2 and the additive is sucked up in the resulting annular stream of the air. Illustrated in FIG. 7 is the third embodiment of the present invention in which said vaporizing head 2 is disposed with its top located within the flared opening 32 of the intake manifold 31 and said venturi portion 20 is formed at a section a distance upstream of the head 2. With this arrangement, the introducing air is firstly accelerated at the venturi portion 20 without becoming turbulent to reach the annular zone Z where the same receive the additives from the porous surface of the conical member 16 of the head 2 and then is channeled also without becoming turbulent to the intake manifold 31. FIG. 8 discloses the forth embodiment of the present invention characterized in that said head 2 is disposed with its top of the porous member 16 facing downstream and said venturi portion 20 is located at the section between the top of porous member and the opening 32 so that the moisture-laden air leaving the head 2 is further accelerated at the venturi portion 20 as well as being prevented from turbulating to be drawn into the intake manifold 31.

Figure 5:
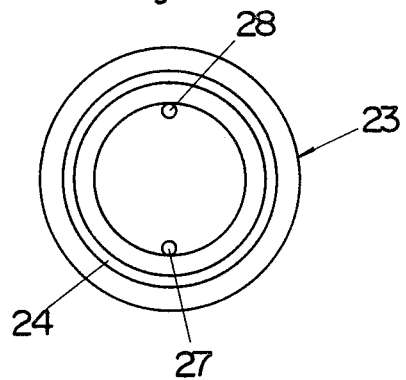
FIG. 5 is a plane view of the base plate shown in FIG. 4.
Figure 6:
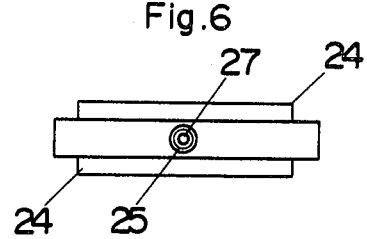
FIG. 6 is an elevational view of the base plate shown in FIG. 4.
Figure 9:
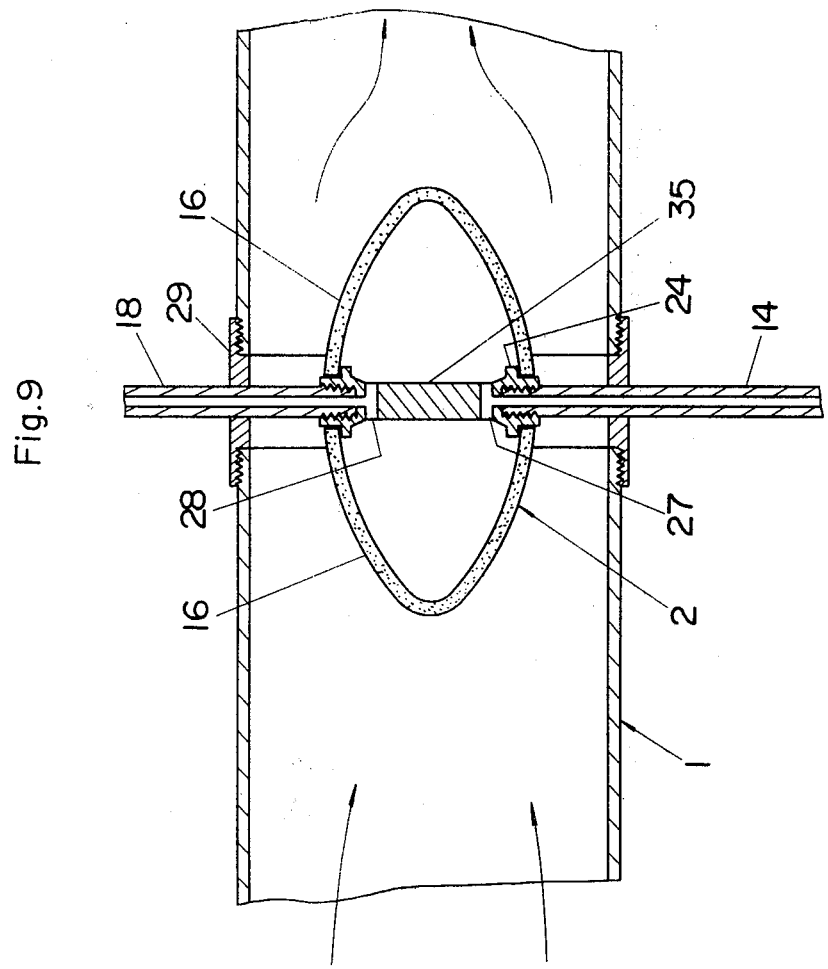
FIG. 9 is an enlarged sectional view of a part of a fifth preferred embodiment of the present invention.

Referring further to FIG. 9, there is disclosed the fifth embodiment of the device which employs the vaporizing head 2 composed of two conical hollow members 16 of porous material and the base plate 35 disposed therebetween for interconnecting two members 16. This plate 35 employed is the same as that disclosed in FIGS. 4 to 6 except that the apertures 27 and 28 penetrate axially the base to open in both the interiors of the conical members 16. The vaporizing head 2 thus formed is of ellipsoidal shape and is held coaxially within the induction duct 1 by the pipes 14 and 18. Into the each interior of the conical members 16 is fed the additive through the above apertures 27 and 28 from the reservoir 3. With this arrangement, the air passing through the annular zone will absorb the additive from in the substantially entires surface of the ellipsoidal head 2 at the same time causing no turbulence in both the front and rear of the head 2.

Figure 10:
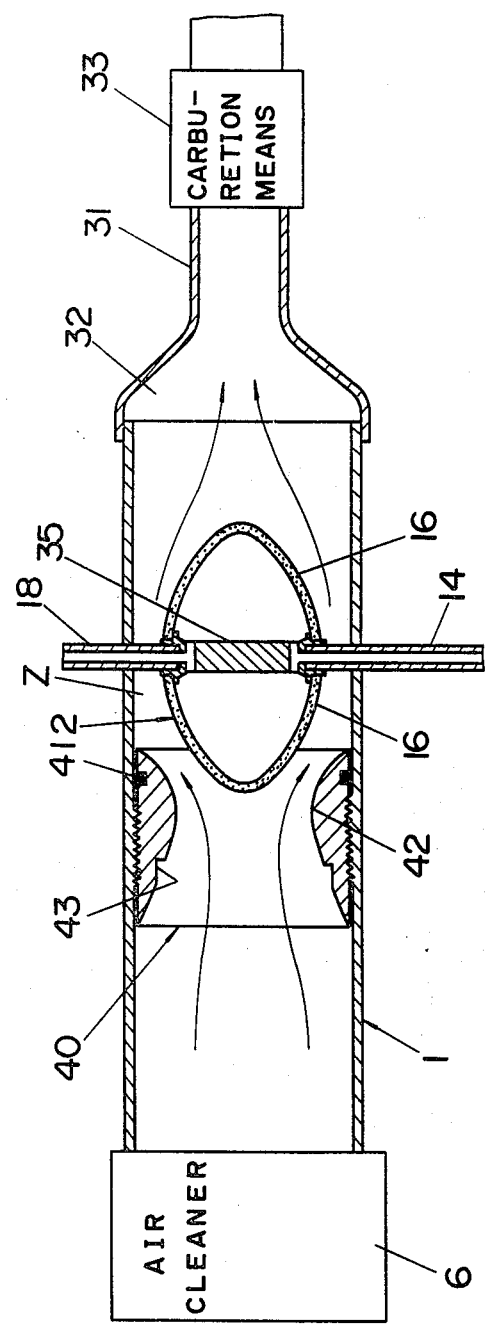
FIGS. 10 and 11 are schematic views showing respectively sixth and seventh preferred embodiments of the present invention.

Referring still further to FIG. 10, there is shown the sixth embodiment of the present invention which includes a venturi ring 40 attached to the inner surface of the duct 1 at a portion upstream of the head 2. This ring 40 is threadedly received in the inner wall of the duct 1 in such a way as to be slidably held along the axis of the duct 1 for regulating the air flow reaching the head 2, while being sealed with the duct 1 by a sealing ring 41. Projected inwardly of the venturi ring 40 is the throat 42 having a generally triangular cross section with a recess 43 which is used to receive a bit for adjusting the ring 40. The vaporizing head 2 is of the same construction as hereinbefore described with reference to FIG. 9. In addition to the device being operated as described in foregoing embodiments, the venturi ring 40 serves to regulate the air flow passing through said annular zone Z to provide an optimum ratio of the additive to the air depending on the types of engines by adjusting the position of the venturi ring 40. That is, the displacement of the ring 40 can vary the velocity of the air passing over the surface of the head 2 and therefore the amount of the additive vaporized in the stream of the air. It consequently follows that a requisite air-additive mixture can be adjustably set in accordance with the requirements varying with the engines on which the device will be installed.

Figure 11:
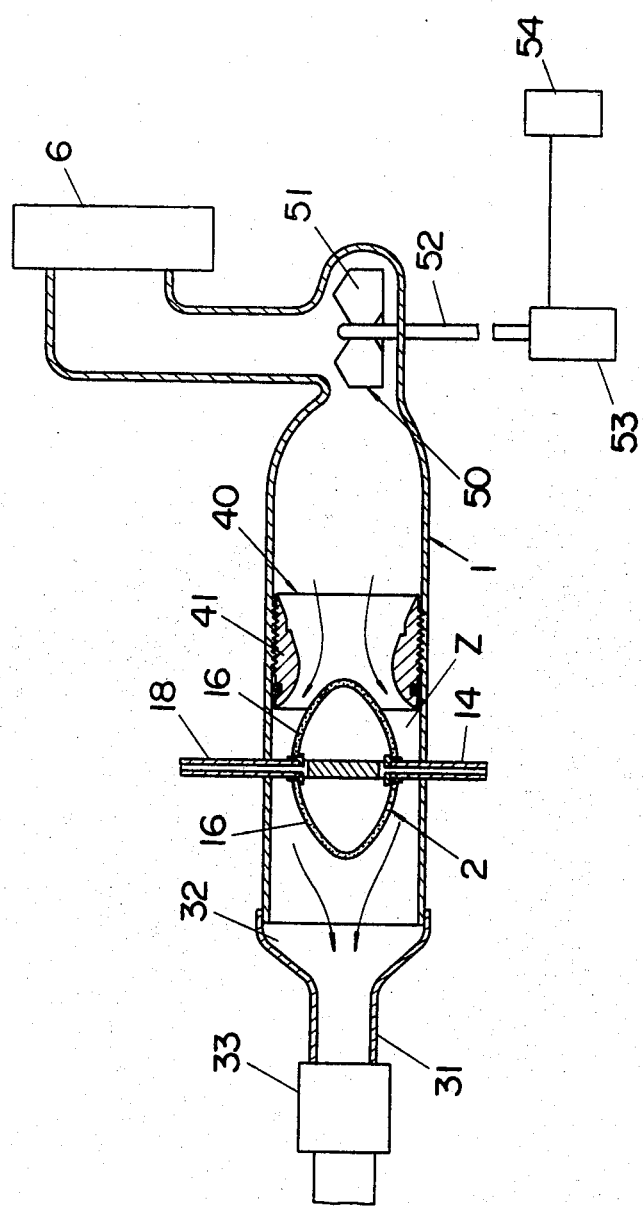

Further illustrated in FIG. 11 is the seventh embodiment of the present invention which includes a supercharger 50 to supply the air of higher density to the annular zone Z between the head 2 and the duct 1. This supercharger 50 comprises a rotor 51 disposed within the duct 1 upstream of the head 2 in proximity of the air cleaner 6 and a shaft 52 driven by the crankshaft of the engine or the exhaust gases via a transmission means 53 controllably actuated by a controller 54. Said controller 54 is provided for controlling the rotor rpm depending on an engine rpm or engine load in such a way as to supply a requisite amount of the air to the combustion chamber of the engine in accordance with the type of the engine and the engine conditions. Between the rotor 51 and the head 2 is also provided the same venturi ring 40 as disclosed in the above embodiment, this venturi ring 40 projecting in the stream of the air, however, also acts as a resistance to the air flow to cause a reduction in the amount of the air drawn in, while positively regulating the air flow toward the head 2. The above supercharger is employed to compensate this reduction in the amount of the air to supply a sufficient or requisite amount of the intake air into the combustion chamber depending on the demand of the engine operation, assuring optimum amount of the moisture-laden air to be mixed with the fuel at a proper ratio on the way to or at the combustion chamber of the engine. Additionally, this embodiment with the supercharger 50 may be effectively adapted to outernal combustion engines besides the above internal combustion engines.

The device of the present invention is adapted in use to the existing engine preferably with its induction duct 1 laying horizontally, and for disposing the duct 1 horizontally within a restricted space may be utilized a flexible hose means interconnecting the duct and the intake manifold as the case may be.

In these embodiments as above, only the way is described to install the device of the present invention with the induction duct 1 connected at the one end to the intake manifold 31 associated with the existing engine and receiving at the opposite end the existing air cleaner removed from the intake manifold 31, however, it will be of course effective to install the device with the one end of the duct 1 directly connected to the air cleaner mounted in the existing intake manifold. In this case, an additional air cleaner is to be mounted in the opposed end of the duct 1 for filtering the incoming air.

Also, the present invention is not limited to be used with engines having a carburetion means in the intake manifold but can be easily adapted to diesel engines or fuel injection engines by supplying the air-additive mixture directly into the combustion chamber of the engines.

Following table shows the relationship between the amount of the additive seeped out of the head of porous material and the negative pressure developed on the surface of the head. The head employed was built up with two conical members made of porous glass (foam glass) to be ellipsoidal shape as illustrated in FIG. 9 having a surface area of 125 cm, the pores diffused across the entire area having approximately a diameter of 0.1 micron and the porosity being 53(%).

TABLE

| negative pressure value (cmHg) | 20 | 30 | 40 |
|---|---|---|---|
| amount of additive seeped out (g/min) | 0.7 | 1.0 | 1.4 |

As shown in the above table, it is recognized that the amount of the additive seeped out of the head varies in direct proportion to the negative pressure developed on the surface of the head. Therefore, it confirms that the additive is to be fed to the resulting air-fuel mixture in an amount directly proportional to the amount of the drawn air in such a way as to provide the increase in engine efficiency along with the decrease in harmful emissions over the entire operational engine conditions.

In accordance with the present invention, the device provides an air-additive-fuel mixture of optimum ratio depending on the engine conditions or engine loads so as to increase combustion efficiecy throughout the operational range of the engine. And, the addition of the additive is effected automatically in response to the engine conditions without using any additional pumping means of complicated construction which will require frequent maintenance adjustments and will be expensive to manufacture.

Also, the vaporizing head 2 is made of porous material having a large number of minute pores uniformly diffused across the entire surface thereof and is disposed within the duct 1 with the substantially entire circumference of the porous wall being in contact with the annular zone Z, therefore the additives in the surface of the porous wall of the head 2 is easily vaporized over the entire surface thereof to be thoroughly mixed with the annular stream of the air passing through the annular zone, allowing the air to contain homogeneously vaporized additive therein and therefore exhibiting a maximum effect of the additive with this simple arrangement of the head 2 to ensure greater reliability and longevity.

Further, the amount of the additive supplied in the air can be decided not only by the venturi portion or venturi ring but also by the porosity and/or the surface area of the head employed.

Additionally, in cold weather regions where water alone can not be used as the additive since it may freeze to break the head, inflammable hydrocarbon liquids containing oxygen such as alcohol and the like may be employed alone or in the form of water solution thereof as the additive. In this case, such additive can be supplied in greater amounts than in the case of the water alone being supplied such that the amount of the fuel to be mixed with the resulting air-additive mixture is reduced, which results in reduced fuel economy.

The above descripstion and particularly the drawings are set forth for purposes of illustration only. It will be understood that many variations and modifications of the embodiments herein described will be obvious to those skilled in the art, and may be carried out without departing from the spirit and scope of the invention.

What is claimed is:

1. A fuel supplement supplying device for an internal combustion engine to add a liquid additive into the air being introduced prior to be mixed with fuel comprising:

an induction duct open at its one end to the atmosphere and communicatively connected at its opposite end to the combustion chamber of the internal combustion engine;

a reservoir disposed outside of said induction duct and adapted to hold a volume of liquid additive such as water and methanol therein;

a hollow vaporizing head disposed within said induction duct upstream of the mixing area where a fuel is mixed with the air passing therethrough to define a constricted annular zone between the head and the induction duct; and a feed line interconnecting the reservoir and the vaporizing head for feeding said liquid additive into the vaporizing head;

said vaporizing head having at least the wall of porous material extending across the entire periphery thereof and defining the contour of the head, said wall of porous material having per se a large number of minute spaced apart pores which are diffused substantially uniformly across the entire surface thereof and being exposed to said constricted annular zone over the substantially entire circumference of the head, and said reservoir being open to the atmosphere, whereby in response to a vacuum developed upon operation of the engine within the induction duct such liquid additive is fed from the reservoir to said head from where the same is sucked out through the pores of the wall into the stream of the air passing through said annular zone toward said mixing area and is vaporized in said air.

2. A fuel supplement supplying device as set forth in claim 1 wherein said induction duct is of circular cross section and said vaporizing head has at least one conical shaped wall portion of porous material, said conical wall portion being disposed with its axis arranged coaxially with that of the induction duct so as to form said constricted annular zone which is elongated longitudinally along the passage of the introducing air.

3. A fuel supplement supplying device as set forth in claim 1 wherein said vaporizing head is an ellipsoidal hollow body which is composed of two conical hollow members, one being made of said porous material and the other made of solid material which is impenetrable to the additive, and the head being disposed coaxially within the induction duct.

4. A fuel supplement supplying device as set forth in claim 3 including a venturi portion projected on the inner surface of the induction duct at a section upstream of said vaporizing head so as to increase the velocity of the introducing air reaching said constricted annular zone.

5. A fuel supplement supplying device as set forth in claim 3 including a venturi portion projected on the inner surface of the induction duct at a section downstream of said vaporizing head so as to increase the velocity of the introducing air leaving said constricted annular zone toward the combustion chamber of the engine.

6. A fuel supplement supplying device for an internal combustion engine to add a liquid additive into the air being introduced prior to be mixed with fuel comprising:

an induction duct open at its one end to the atmosphere and communicatively connected at its opposite end to the combustion chamber of the internal combustion engine;

a reservoir disposed outside of said induction duct and adapted to hold a volume of liquid additive such as water and methanol therein;

a hollow vaporizing head disposed within said induction duct upstream of the mixing area where a fuel is mixed with the air passing therethrough to define a constricted annular zone between the head and the induction duct;

a feed line interconnecting the reservoir and the vaporizing head for feeding said liquid additive into the vaporizing head; and a venturi ring slidably attached on the inner surface of the induction duct upstream of the vaporizing head so as to vary the velocity of the introducing air reaching said annular zone;

said vaporizing head being an ellipsoidal body disposed coaxially within the duct and having at least one conical hollow member of porous material which is defined as to have per se a large number of minute spaced apart pores diffused substantially uniformly across the entire surface thereof, and said reservoir being open to the atmosphere, whereby in response to a vacuum developed upon operation of the engine within the induction duct such liquid additive is fed from the reservoir to said head from where the same is sucked out through the pores of the wall into the stream of the air passing through said annular zone toward said mixing area and is vaporized in said air.

7. A fuel supplement supplying device as set forth in claim 6 including a supercharger means disposed within the induction duct upstream of the head for forcing the incoming air into said annular zone.

* * * * *